Feb. 16, 1943.  J. L. KNIGHT  2,311,446
REFRIGERATOR CABINET
Filed June 28, 1941  2 Sheets-Sheet 1

Inventor:
James L. Knight,
by Harry E. Dunham
His Attorney.

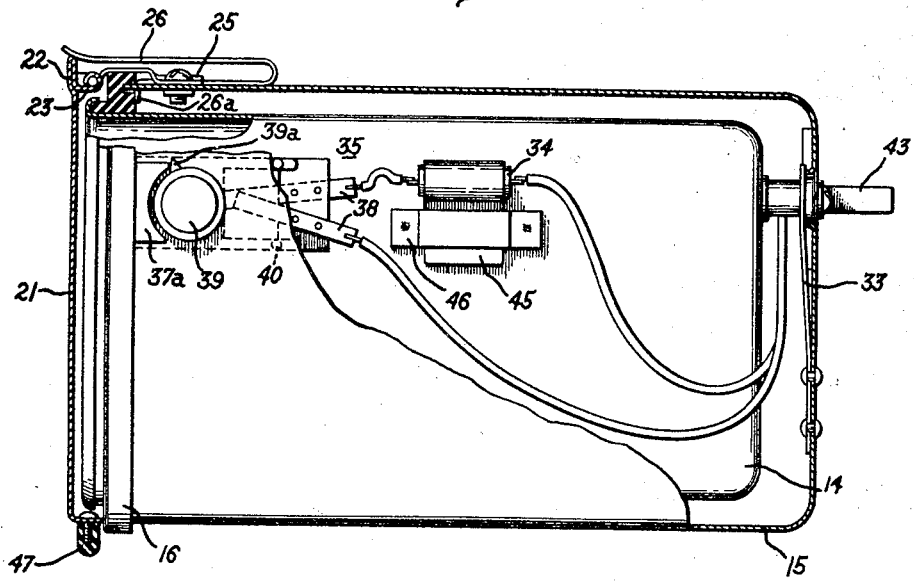

Patented Feb. 16, 1943

2,311,446

UNITED STATES PATENT OFFICE 2,311,446

REFRIGERATOR CABINET

James L. Knight, Erie, Pa., assignor to General Electric Company, a corporation of New York Application June 28, 1941, Serial No. 400,189

4 Claims. (Cl. 312—112)

My invention relates to refrigerator cabinets and more particularly to receptacles or compartments provided within the food storage compartment of refrigerator cabinets for the purpose of maintaining food, such as butter and the like, at a temperature higher than that within the main food storage space of the cabinet.

In order that food stuffs may be properly preserved in a refrigerator, it is necessary to maintain the food storage space within the cabinet at a temperature lower than that at which butter spreads easily. When butter is kept in the refrigerator cabinet, it is necessary that it be warmed up before it is in condition for serving at table. Accordingly, it is an object of my invention to provide a new and improved receptacle or compartment constructed and arranged to be disposed within the refrigerated compartment of a refrigerator cabinet and for maintaining the butter kept therein at a temperature which will permit easy spreading thereof.

Further objects and advantages of my invention will become apparent as the following description proceeds, and the features of novelty which characterize my invention will be pointed out with particularity in the claims annexed to and forming a part of this specification.

Figure 1:
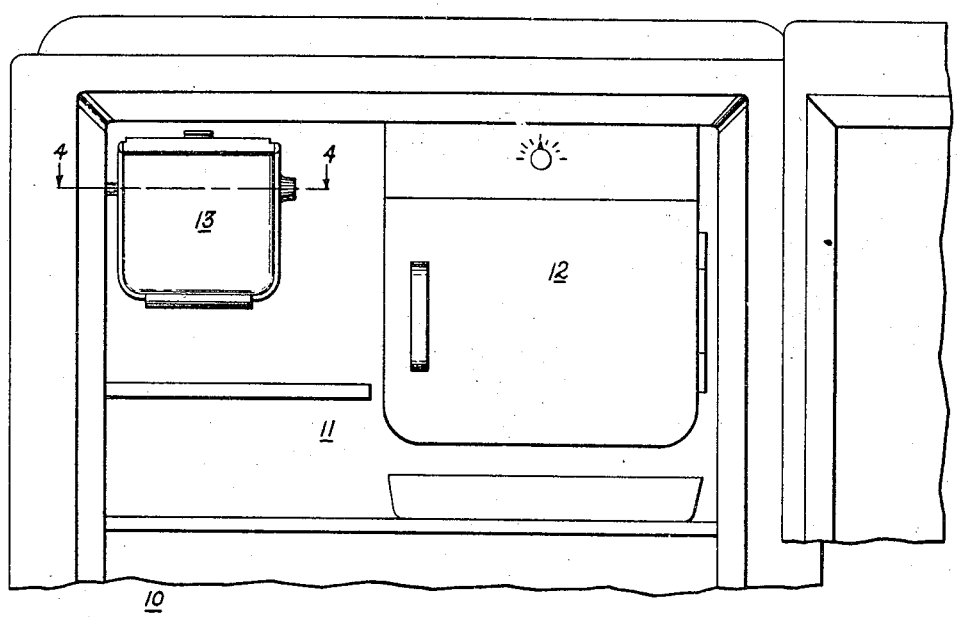
Figure 2:
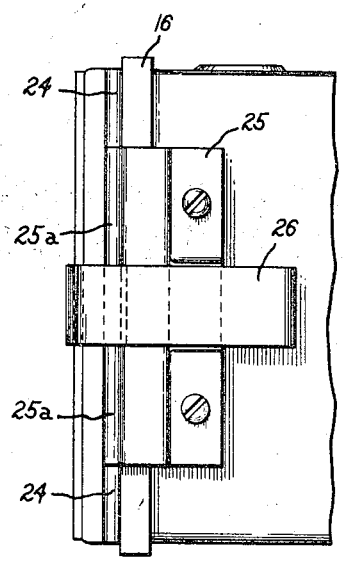

For a better understanding of my invention, reference may be had to the accompanying drawings in which Fig. 1 is a partial view of a household type refrigerator provided with a compartment or receptacle embodying the principles of my invention; Fig. 2 is an enlarged partial view looking downwardly on the receptacle shown in Fig. 1; Fig. 3 is an enlarged side view, partly in section, of the receptacle shown in Fig. 1; and Fig. 4 is a sectional view of the receptacle taken along the line 4—4 of Fig. 1.

Referring to the drawings, there is illustrated in Fig. 1 a refrigerator cabinet 10 of the domestic type having a food storage compartment 11 arranged to be cooled by a suitable cooling unit or refrigerant evaporator 12. In order to maintain butter and the like at a temperature above that generally prevailing in the storage space 11 but usually lower than the temperature prevailing exteriorly of the cabinet, there is provided a receptacle or compartment 13 having thermally insulated walls. The receptacle is provided with thermostatically controlled heating means as hereinafter described in order that heat may be imparted to the interior of the receptacle.

As best seen in Figs. 3 and 4, the walls of the butter compartment or receptacle comprise inner and outer shells or walls 14 and 15, respectively. The inner liner should be formed from a material which is a relatively good conductor of heat, preferably of metal, such as aluminum, for example. The outer shell may be made of metal or any other suitable material, as a plastic material, for example. The shells are maintained in spaced-apart relationship by means of a frame or spacer member 16 formed from a material having relatively poor heat conducting characteristics, as a suitable plastic for example. In the form illustrated in the drawings, the spacer member or element 16 is generally rectangular in cross section and extends entirely around the receptacle in order to close the space between the shells at the front end of the receptacle. By this construction there is provided a layer of substantially dead air between the interior of the receptacle 13 and the food storage compartment 11 which serves to minimize the transfer of heat through the walls of the receptacle. The back face of the spacer is provided with a groove 17 which receives the front edge of the outer shell 15. On the front face of the spacer there is provided a shoulder 18 engaging the turned back edge of the inner shell. The spacer 16 can be made integral with the outer shell if material which is a relatively poor conductor of heat is employed.

Means for maintaining the shells and spacer in assembled relationship is provided. For this purpose there is shown a pair of fastening members in the form of studs 19 extending through suitable openings in the rear wall of the inner shell or casing. The studs are preferably formed from material having relatively poor heat conducting characteristics, as a plastic material, for example. The fastening means is completed by a pair of suitably threaded members such as screws 20 extending through suitable openings in the rear wall of the outer shell into engagement with suitably threaded bores in the studs 19. The foregoing structural details of the butter conditioner are not my invention but are shown and claimed in the copending application of La Mar S. Cooper, Serial No. 386,947, filed April 4, 1941, and assigned to the same assignee as the present invention.

A hinged door or closure member 21 is provided for closing the opening in the front wall of the receptacle. A handle 47 is suitably attached to the door. In the illustrated form, the closure member of the door 21 is formed of sheet metal and is bent back upon itself across the top edge of the door as indicated by the numeral 22 and for the purpose to be described hereinafter although any suitable material can be used. A door made of poor heat conductive material will reduce heat leakage therethrough. The door is also provided with a laterally and rearwardly extending flange 23, the material at the free edge of the flange being rolled upon itself to provide a hinge member having a pair of hinge knuckles 24, as best seen in Figs. 2 and 3. The door is hingedly attached to a second hinge member or device in the form of a hinge plate 25 which is provided with a rolled-over portion, thereby providing a hinge knuckle 25a. A suitable pintle (not shown) is passed through the knuckles 24 and 25a of the hinge assembly. The hinge plate is suitably secured to the top wall of the outer shell in any suitable manner as by means of nuts and bolts, for example.

There is provided means for maintaining the door in its fully closed or fully open position. This means comprises the aforementioned turned back portion 22 of the door and a substantially U-shaped spring 26. The lower arm of the spring, as viewed in Fig. 3, is retained in position on the upper wall of the shell by means of the hinge plate 25 which passes thereover. The spring is accurately positioned by means of a laterally extending portion 26a which extends through a suitable opening in the top wall of the outer shell. The spring 26 biases the door to its fully closed position or to its fully open position depending upon the angle of the plane of the door with respect to the spring 26. The door and spring arrangement therefor is described and claimed in the copending application of Harold Smith, Serial No. 400,681 filed July 1, 1941, and assigned to the same assignee as the present invention.

I have provided means for supporting the compartment or receptacle 13 from the walls of the refrigerator cabinet. In the illustrated form of my invention, the receptacle 13 is placed in an upper corner of the storage compartment 11. The receptacle is supported at the rear by means of a pair of heat insulating studs 27 suitably secured to the rear wall 28 of the refrigerator as by means of screws extending through suitable openings in the wall 28 into threaded engagement with suitably threaded bores in the studs. The studs pass through suitable openings 27a in the rear wall of the outer shell. The receptacle is supported from a side wall 29 of the refrigerator cabinet by means of a heat insulating stud 30 provided with an enlarged portion or head 31. The stud extends through a suitable opening 32 in the side wall of the outer shell 15. In order to maintain securely the receptacle in position, I have provided a pair of spring members 33, illustrated as being of the leaf type, suitably attached to the inner side of the rear wall of the outer shell as by means of rivets, for example. The springs 33 are arranged to bear against the ends of the studs 27 thereby urging the receptacle forward with respect to the rear wall of a refrigerator cabinet and therefore urging a portion of the edge of the opening 32 into engagement with the stud 30. Lateral movement of the receptacle from the wall 29 is prevented or limited by the studs 27 and the head 31.

There is provided means for applying heat to the interior of the receptacle and for regulating the temperature therein. This means comprises an electric heater 34, a thermostat 35 and suitable connections for incorporating the heater and thermostatic element in an electric circuit. The electrical assembly illustrated herein is so arranged that it may be assem[bled] in the receptacle structure with only the us[e of] screws 20 or the like for holding it in pl[ace] thereby providing a structure which is extre[mely] simple to assemble or disassemble. The he[ater] is held in intimate thermal engagement [with] the inner shell 14 by means of a clamp or 45 which slips under a bracket 46 suitably [se]cured to the inner shell as by welding, for [ex]ample.

The heater is preferably located on or a[dja]cent the top wall of the inner liner. This position of the source of heat provides a t[em]perature gradient within the inner liner or s[hell] of the same order as the natural tempera[ture] gradient for the air in the space between [the] liners or shells, thereby minimizing convec[tion] currents within the space and heat leakage It is preferable to utilize a concentrated [heat] source, as by employing a heater which is ph[ysi]cally small, in order to minimize the temp[era]ture gradient over the surface of the inner l[iner] or shell so that a relatively uniform temp[era]ture distribution within the receptacle and m[ini]mum heat leakage is obtained.

The thermostatic element 35 is provided [with] a heat insulating frame 36 having a late[rally] extending portion 37 which is adapted to ex[tend] outwardly through a suitable opening in [the] front edge of the side wall of the recept[acle.] As best seen in Figs. 3 and 4, the projectio[n] serves to position the thermostatic element. [In]asmuch as the details of the electrical po[rtion] of the thermostatic element are no part o[f my] invention, it is believed unnecessary to pr[ovide] illustration thereof and therefore in the d[raw]ings I have merely disclosed in outline fo[r the] thermostatic element 35 and a pair of elect[rical] terminals 38. In order to vary the tempera[ture] within the receptacle to suit the preferenc[e of] the user of the device, the thermostatic ele[ment] is preferably adjustable. There is illustrat[ed a] knob 39 attached to a shaft extending thr[ough] an opening in the projection 37 for this pur[pose.] In order to minimize the transfer of heat [from] the thermostatic element 35 to the outer [shell] there is provided a plurality of studs or [pro]jections 40 on the outer surface of the ther[mo]static element thereby minimizing the are[a of] contact between the thermostat base or f[rame] and the outer or shell liner. As illustrat[ed in] Fig. 4, the thermostat is made of the co[rrect] thickness to be held rigidly between the she[ll] casings. Projection 37 is provided wit[h an] arcuately shaped shoulder 37a, the ends th[ereof] serving as stops for pointer 39a of the adjus[ting] member 39.

There are provided electrical connection[s] including the heater and thermostat in an [elec]trical circuit. There is provided in the [rear] wall of the cabinet a terminal block 41 ha[ving] a pair of terminals suitably connected t[o the] electric circuit. I have illustrated the conn[ector] or terminal block 41 being secured in po[sition] by a plate 42 suitably attached to the ter[minal] block and retained between the studs 27 [and] the rear wall 28, the fastening means asso[ciated] with the studs passing through suitable ope[nings] in the plate. There is provided a plug ass[embly] comprising suitable terminals 43 suitably se[cured] to a plate 44 of electrically insulating ma[terial.] The rear wall of the outer casing is pro[vided] with an opening through which the ter[minals] 43 extend and the plate 44 is retained be[tween] the outer shell and the studs 19, and scre[ws]

passing through suitable openings in the plate 44. Suitable electrical connections are made between the terminals, the heater 34 and the thermostat 35. The electrical devices are described and claimed in the aforementioned Cooper application.

In assembling the receptacle, the frame or spacer member 16 is first placed over the inner shell. The electrical assembly is then placed in position with the clip 45 inserted in the bracket 46. The outer shell is then assembled over the inner liner or shell, frame and electrical assembly. The studs 19 and fastening members 20 are then engaged and tightened. It will thus be seen that a very simple structure permitting easy assembly is provided. With this arrangement of parts it will be seen that as soon as the outer shell is removed, the entire electrical assembly can be removed and a new one put in place without any soldering of connections or tightening of screw terminals.

While I have shown a particular embodiment of my invention, I do not desire my invention to be limited to the particular construction shown and described and I intend in the appended claims to cover all modifications within the spirit and scope of my invention.

What I claim as new and desire to secure by Letters Patent of the United States, is:

1. In a compartment of a refrigerator or the like, a removable auxiliary receptacle, and means for supporting said receptacle in said compartment, said receptacle having an opening in a wall thereof, a first member on a wall of the compartment extending through said opening, said receptacle having a second opening, a second member on a wall of said compartment extending into said second opening, means carried on the inside surface of the wall of said receptacle adjacent said first-mentioned opening and engaging said first member for biasing said receptacle into frictional engagement with said second member for supporting said receptacle in place.

2. In a refrigerator cabinet or the like having a food storage compartment, a removable auxiliary receptacle, means for supporting said receptacle in a corner of said compartment, said receptacle having an opening in a wall thereof, a first member on a wall of the compartment and extending through said opening, said receptacle having a second opening in another wall thereof, a second member on the wall of said compartment adjacent said second opening and extending into said second opening, spring means carried by said receptacle on the inner side of said wall adjacent said first opening and engaging said first member for biasing said receptacle into frictional engagement with said second member to support said receptacle in place, said second member having an enlarged head for cooperating with said first member normally to limit lateral movement of said receptacle from the wall adjacent said second opening.

3. In a compartment of a refrigerator or the like, a removable auxiliary receptacle and means for supporting said receptacle in a corner of said compartment, said receptacle having an opening in the rear wall thereof, a first member on the rear wall of the compartment extending through said opening, said receptacle having a second opening in the side wall adjacent the side wall of the compartment, a second member on said side wall of said compartment and extending into said second opening, and means carried on the inner surface of said receptacle engaging said first member for biasing said receptacle into frictional engagement with said second member for supporting said receptacle in place.

4. In a refrigerator cabinet or the like having a food storage compartment, a removable auxiliary receptacle and means for supporting said receptacle in a corner of said compartment, said receptacle having an opening in the rear wall thereof, a first member on the rear wall of the compartment and extending through said opening, said receptacle having a second opening in the side wall adjacent the side wall of the compartment, a second member on said side wall of said compartment and extending into said second opening, and leaf-spring means, one end of said spring means being secured to the inner surface of said rear wall of said receptacle, the other end of said spring means engaging said first member for biasing said receptacle into frictional engagement with said second member to support said receptacle in place, said second member having an enlarged head for cooperation with said second opening and first member normally to limit lateral movement of said receptacle from said side wall.

JAMES L. KNIGHT.